US007501728B2

(12) United States Patent
Knauff et al.

(10) Patent No.: US 7,501,728 B2
(45) Date of Patent: Mar. 10, 2009

(54) ELECTRIC MACHINE WITH A WINDING SUPPORT ASSEMBLY AND A MEASURING SYSTEM

(75) Inventors: Axel Knauff, Münnerstadt (DE); Holger Schunk, Lendershausen (DE); Reiner Seufert, Salz (DE)

(73) Assignee: Siemens Aktiengesellschaft, München (DE)

( * ) Notice: Subject to any disclaimer, the term of this patent is extended or adjusted under 35 U.S.C. 154(b) by 793 days.

(21) Appl. No.: 10/952,532

(22) Filed: Sep. 28, 2004

(65) Prior Publication Data

US 2005/0082940 A1 Apr. 21, 2005

(30) Foreign Application Priority Data

Sep. 29, 2003 (DE) ................................ 103 45 631

(51) Int. Cl.
*H02K 3/12* (2006.01)
*H02K 11/00* (2006.01)

(52) U.S. Cl. ...................... 310/68 C; 310/194; 310/260

(58) Field of Classification Search ............... 310/68 R, 310/68 B, 68 C, 68 E, 194, 260
See application file for complete search history.

(56) References Cited

U.S. PATENT DOCUMENTS

| | | | | |
|---|---|---|---|---|
| 4,313,069 | A * | 1/1982 | Szabo et al. | 310/68 C |
| 4,571,518 | A * | 2/1986 | Kintz et al. | 310/68 R |
| 5,343,613 | A * | 9/1994 | Kintz et al. | 29/596 |
| 6,346,810 | B2 * | 2/2002 | Cho et al. | 324/244.1 |

FOREIGN PATENT DOCUMENTS

| | | |
|---|---|---|
| DE | 1 588 986 | 1/1971 |
| DE | 23 52 946 | 4/1975 |

* cited by examiner

*Primary Examiner*—Karl Tamai
*Assistant Examiner*—David W. Scheuermann
(74) *Attorney, Agent, or Firm*—Henry M. Feiereisen; Ursula B. Day

(57) ABSTRACT

An electric machine, in particular a motor, includes a winding support assembly and a measuring system, preferably an infrared measuring system, The measuring system has at least one sensor and an evaluation unit, whereby the measuring system is integrated in the winding support assembly. The infrared sensor, which operates without making contact with the winding support assembly, provides almost instantaneously a measurement value that is proportional to the actual temperature of the winding system, thereby significantly improving motor protection. The sensor can be embedded and sealed in the winding support assembly.

10 Claims, 4 Drawing Sheets

ELECTRIC MACHINE WITH A WINDING SUPPORT ASSEMBLY AND A MEASURING SYSTEM

CROSS-REFERENCES TO RELATED APPLICATIONS

This application claims the priority of German Patent Application, Serial No. 103 45 631.7, filed Sep. 29, 2003, pursuant to 35 U.S.C. 119(a)-(d), the disclosure of which is incorporated herein by reference.

BACKGROUND OF THE INVENTION

The present invention relates to an electric machine with a winding support assembly and with a measuring system.

Nothing in the following discussion of the state of the art is to be construed as an admission of prior art.

At least the stator of electric machines includes a winding system that has to be connected in an end region of this electric machine. The lead-out wires of the winding system can be connected by manually welding or soldering. Insulating tubing is typically placed over the welded or soldered connections. The insulating connections are subsequently attached to a coil bobbin with cable ties.

German patent publication no. DE 15 88 986 discloses methods and systems for attaching windings, in particular end turns. An attachment device for the winding strands of an electric machine is described, wherein the winding strands are held together by an holder with fingers that hold the connecting wires.

German patent publication no. DE 23 52 946 describes a stator for induction machines, whereby each of the end turns of the exciter winding that projects from both sides of the laminated stator is provided with a tight-fitting shaped body that is pressed on. The shaped body is made of an insulating lattice structure, whereby the insulating lattice structure of the shaped body has pockets arranged around the periphery that receive the connecting ends of the winding strands. The winding strands are connected by soldering, welding or crimp sleeves. Disadvantageously, the location of the lead-out wires and/or the end turns is fixed, while the lead-out wires are neither properly routed nor reliably connected.

The aforementioned disadvantages in these electromagnetic assemblies, in particular electric motors, for example servo movers, can be eliminated by using a wiring support assembly. Such wiring support assemblies are structures that guide the lead-out wires through a meander-like configuration, thereby ensuring that the required air gaps and leakage paths are maintained and that the wires are properly attached. The wiring support assembly is preferably manufactured as an injection molded part and can be mass-produced at low-cost.

In addition, sensors that monitor various motor parameters are increasingly integrated in electromagnetic assemblies, in particular electric motors. Such motor parameters are, for example, the motor acceleration, the motor temperature, in particular the winding temperature, etc. Particularly the winding temperature is a critical parameter in electric motors that operate at their rated maximum power. The maximum allowable winding temperature determines the efficiency of the electric motor. The motor can fail or be destroyed if the allowable winding temperature is exceeded. Monitoring the winding temperature, in particular in high-efficiency drives, is therefore of extreme importance. Therefore, in particular temperature sensors are integrated in or on motors. Other sensors useful for measurement and monitoring purposes are acceleration sensors, vibration sensors or noise sensors, etc. The electromagnetic assemblies, in particular electric motors, for example servo motors, must be able to endure high vibration and shock loads without the risk of failure. It is therefore important to securely attach and/or to integrate the sensors in or on the motor and also to guarantee their functionality, in particular for temperature measurements. For example, if an air gap is created between the winding and the sensor, then the time constant of the protective circuits can change, so that the motor can be completely destroyed, for example as the result of a fire, before the protective circuit can respond to the increase in temperature. The sensors, in particular temperature sensors, so far have been mechanically attached to the winding, for example by cable ties. The produced air gap is filled by immersing the winding in a resin. Disadvantageously, however, the size of the gap is then not defined. This changes the time constant of the protective circuit, which depends on the size of the gap, making the motor protection unreliable.

It would therefore be desirable and advantageous to provide an improved electric machine with a sensor having improved monitoring performance.

SUMMARY OF THE INVENTION

According to one aspect of the invention, an electric machine includes a stator having opposing end faces and a plurality of grooves, and at least one winding system having winding strands disposed in the grooves of the stator. The grooves make it possible to place on the end faces of the stator end turns or terminal connections for the lead-out wires. The electric machine further includes at least one winding support assembly disposed on at least one end face of the stator and including means for fixing and guiding the lead-out wires of the winding system. The winding support assembly includes at least one measuring system that is integrated in the winding support assembly.

The measuring system is thereby reliably secured in the wiring support assembly attached to the motor, i.e., fixedly embedded in the motor structure. The measuring system is hence protected by the wiring support assembly, so that the sensor can reliably operate even during strong shocks or vibrations.

In more complex winding arrangements, several support assemblies can optionally be arranged sequentially in the axial direction, which can prevent faults resulting from complex winding connections. In such case, the measuring system can be configured so that all winding systems can be monitored simultaneously.

Advantageously, the winding support assembly can also include a snap-on cover that can help increase the air gaps and leakage paths and therefore also increase the breakdown voltage. In addition, unattached wires, such as lead-out wires, can be secured in this manner. The cover may also provide strain relief for the electric supply wires in form of terminals or a meander-like wire placement.

According to an advantageous embodiment of the invention, the winding system can include tooth coils.

According to another advantageous embodiment of the invention, the measuring system can include one or more temperature sensors, vibration sensors, noise sensors and/or acceleration sensors. In addition, the measuring system can include at least one evaluation unit that is connected with the at least one sensor by transmission means for bidirectional data exchange.

Advantageously, the sensor is arranged inside the wiring support. A suitable location for measuring a parameter, such as temperature, vibrations, noise, acceleration, ultrasound, etc., can be selected depending on the type of the sensor, which is made easy by the small size of the sensors. Several sensors can also be used simultaneously. These sensors can monitor different parameters or the same parameter.

The evaluation unit is preferably arranged on or at least in the vicinity of the wiring support or the winding support assembly and can optionally include a display. The measurement values measured by the respective sensors are transmitted to the evaluation unit by transmission means, for example a cable. It will be understood that the transmission means can include various conventional types of wired or wireless transmission means suitable for data transmission, such as, for example, electric cables, opto-electronic devices, radio links, etc. Advantageously, the evaluation unit with the associated display can be located on or in the vicinity of the wiring support so as to be able to view the displayed values at a readily accessible location. Advantageously, depending on the type of the employed sensor, the evaluation unit can also include other suitable means, such as software, for converting the values measured by the sensors into other units for display. Advantageously, the values can also be stored in a memory located in the evaluation unit and can be read out on demand. In addition to the memory, the evaluation unit can also include a serial and/or parallel interface.

Advantageously, the evaluation unit can also accept input of external parameters and/or store adjustable, predefined limit values for the parameters to be measured, in particular warning and threshold temperatures. Input can be provided via a keypad integrated in the evaluation unit or externally via the serial or parallel interface. The values can be stored in the memory of the evaluation unit. The functionality for the evaluation unit can be provided by software programs stored, for example, in the evaluation unit to allow a comparison between the values measured by the sensors and the predetermined limit values and to determine if an actual measurement volume lies inside or outside a tolerance range or below a predetermined limit value. If the measured parameters, in particular the temperature, lie below and/or exceed the adjustable predefined limit values, then the system can output a corresponding warning, for example, in form of an acoustic signal, such as a siren, or in another manner.

According to another advantageous embodiment of the invention, the measuring system can operate contactless, i.e., without the sensor making mechanical contact with the winding system. One exemplary advantageous measuring system is, for example, an infrared measuring device. The measuring system can output a measurement value that is proportional to the temperature.

The temperature of electromagnetic assemblies, in particular electric motors, has hitherto been measured by temperature sensors inserted in the end turns. The quality of the measured value is directly affected by the thermal coupling of the sensor. Since the temperature sensor has a certain mass, it has also an associated thermal time constant that causes the measured value to lag the actual temperature of the winding. For example, the sensor may have an electric insulation, which exacerbates the coupling by increasing the time constant. This may, for example in a highly dynamic operation, cause the winding to overheat and be damaged, before the measuring system is able to measure the excessive temperature that damages the winding. A warning or threshold temperature is therefore set in the control and evaluation unit to a value that is typically 10% less than would otherwise be necessary. The motor is then prevented from operating optimally at its rated power limit. This applies also to motors with winding systems using tooth coils.

With the contactless measuring system according to the invention, in particular an infrared measuring system, for example for temperature measurements, problems associated with thermal coupling can be averted. The sensor of the measuring system is hereby installed at a suitable location in the winding support assembly to detect, without making contact with the winding, the radiation, in particular the infrared radiation, emitted by the winding. The emitted infrared radiation is proportional to the temperature of the winding. By using a contactless measuring system, for example the described infrared measuring system, the sensor can be installed with a gap relative to the winding, which also makes it unnecessary to electrically insulate the sensor. The measured infrared radiation is simultaneously transmitted to the evaluation unit for evaluation and processing, for example via transmission means, such as a wired connection.

The measuring system can then almost instantaneously provide a measurement value that is proportional to the actual temperature of the winding. Consequently, the warning temperature, i.e., the temperature at which a warning is sounded because the excess temperature could damage the winding and therefore also the motor, needs only be reduced slightly or not at all. Electric motors can then safely operate closer to their rated power limit.

According to another advantageous embodiment of the invention, the sensor can be encapsulated or sealed in the winding support assembly. In other words, the sensor can already be encapsulated in the winding support assembly of the motor during manufacture. The position of the sensors and their connection with the motor is then well defined, which not only significantly reduces the corresponding time constant, but also its variation due to manufacturing tolerances. The sensor can be located and encapsulated at the most suitable location for the parameter to be monitored.

In addition, the sensors need no longer be manually attached to the motor, which simplifies manufacture and reduces the production time, while also eliminating errors during assembly and the risk of mechanical and electrical damage to the sensors. In an alternative embodiment, sensors, such as temperature sensors, could also be attached to or encapsulated in the winding support by using a spring-like structure in order to ensure a reliable contact with the surface to be measured. Advantageously, sensors could also be attached to the bottom side of the winding support assembly between the winding support and the stator.

Advantageously, an automation system can be provided with the afore-described electric machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
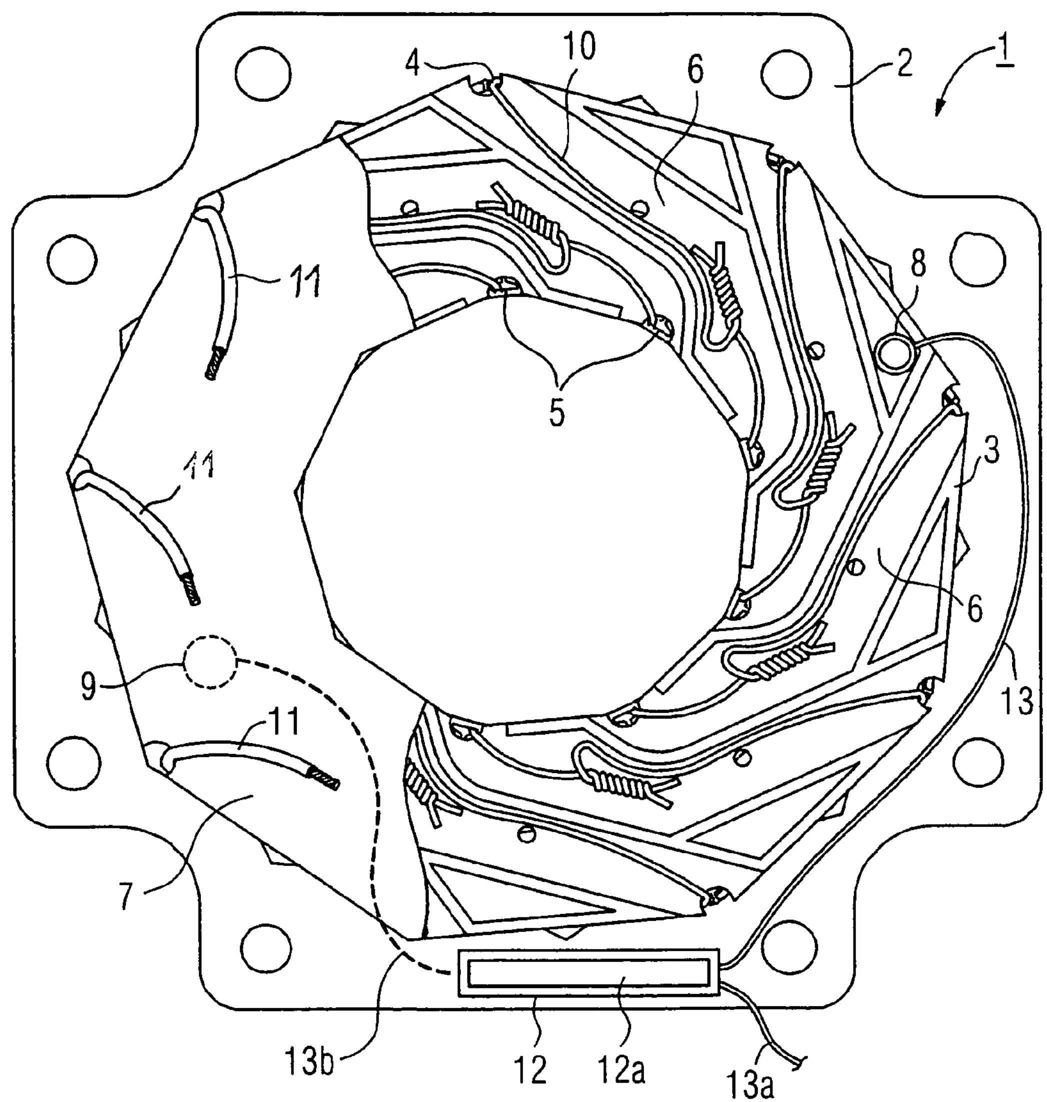
FIG. 1 shows in a side view a stator of an electric machine with a winding support assembly with a partially cut-open cover.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a side view a stator 1 of an electric machine (not shown) with a stator housing 2 and a winding support assembly 3 disposed on an end face of the housing 2. The winding support assembly 3 is partially cut open and includes a cover 7, which is only shown in the left half of FIG. 1. Channels 6 of the winding support assembly 3 with winding strands 10 are visible on the right side of the winding support assembly 3. The winding strands 10 of the respective coil arrangement exit either on the radially outward edge 4 of the winding support assembly 3 or on the radially inward recesses 5 of the winding support assembly 3. The coil assemblies of each phase can be connected in the winding support assembly 3, either in series or in parallel.

Two or more winding strands 10, in particular the lead-out wires 11, can be electrically connected in the corresponding channels 6. Advantageously, the channels 6 in the wiring support assembly 3 are formed as spirals. This significantly simplifies the connections by preventing a wrong connection of the winding strands.

The electrical contacts, for example in the form of welded, soldered or crimped connections, can be embedded in these channels 6. The air gaps and leakage paths of different phases can thereby be maintained. If additional measures are required, an additional cover 7 can be positioned on the wiring support assembly 3, for example in form of a snap-on connection, which can also be used to secure unattached lead-out wires 11.

FIG. 1 also shows a measuring system, preferably an infrared measuring system, which includes two exemplary sensors 8, 9, for example infrared sensors, for contactless measurement of the temperature, as well as an evaluation unit 12. The sensors 8, 9, are advantageously arranged inside the wiring support assembly 3. A suitable location can be selected for measuring the corresponding parameters depending on the type of measurement performed by the employed sensors 8, 9, such as temperature measurement, vibration measurement, noise measurement, acceleration measurement, ultrasound measurement, etc., which can be readily done because of a small size of the sensors 8, 9. It will be understood, that several sensors 8, 9 can be used simultaneously, with the sensors 8, 9 monitoring different parameters or the same parameter.

The sensors 8, 9 can be connected with the evaluation unit 12 by transmission means 13, 13*b*, for example cables. The sensor 9 and the transmission means 13*b* in FIG. 1 are obscured from view and are therefore indicated by a dashed line. Advantageously, the sensor 9 (not visible) is arranged on the side of the wiring support assembly 3 between the winding support assembly 3 and the stator 1. The transmission means 13, 13*b* between the sensor 8 and the evaluation unit 7 is provided for data transmission, for example for bidirectional data exchange. One transmission means 13*a* is shown with an open connection, which can be used to connect, for example, a data processing unit, for example a computer, with the evaluation unit 12 for data transfer, such as bidirectional data transfer. The computer is not shown for sake of clarity. The transmission means 13, 13*a*, 13*b* for data transmission can be implemented either wired or wireless, for example with electric cables, opto-electronically, or a radio link. The number of sensors 8, 9 is not limited to two sensors, and one sensor 8 or more than two sensors 8, 9 can be used depending on the specific requirements.

The measuring system, in particular the sensor 8, 9, is integrated in the winding support assembly 3. In this way, the measuring system is securely affixed to the winding support assembly 3 attached to the motor, i.e., fixedly integrated in the motor structure. The measuring system is thereby also protected by the winding support assembly 3, so that the sensors can reliably operate even in the presence of strong vibrations or shocks.

Advantageously, the sensors 8, 9 are embedded and/or sealed in the winding support assembly 3, which can be done already during the manufacturing process, i.e., at the start of the assembly. This also defines the position of the sensors 8, 9 and their attachment to the motor early in the manufacturing process, so that the corresponding time constant for the temperature measurement and its variation as a result of the manufacturing tolerances can be significantly reduced, thereby improving motor protection.

The evaluation unit 12 includes a display 12*a* and is advantageously located on or in the vicinity of the winding support assembly 3, because this location is easily accessible for data input and output. However, the evaluation unit 12 can also be located at other locations. Advantageously, depending on the type of the employed sensors 8, 9, the evaluation unit 12 can includes, for example software, for converting the values measured by the sensors 8, 9 into other desired units, which can then be displayed. Advantageously, the values can also be stored in a memory in the evaluation unit 12 and read out as needed. The evaluation unit 12 can also include at least one memory and/or a serial and/or parallel interface, neither of which is shown in the drawing for sake of clarity. The measured values, for example the temperature of the winding system, are transmitted by the sensors 8, 9 via the corresponding transmission means 13, 13*b*, for example cables, to the evaluation unit 12. However, the sensors 8, 9 can also be arranged at other locations within the winding support assembly 3. The actual location for the sensors 8, 9, depends on the physical quantities to be measured by the sensors 8, 9. In particular for contactless temperature measurements, the infrared sensors 8, 9 can be installed at suitable locations in the wiring support 3 suitable for contactless measurement of the radiation, in particular the infrared radiation, emitted by the winding 10. This avoids in particular a thermal coupling between a sensor 8, 9 and the winding 10. The emitted infrared radiation is proportional to the temperature of the winding 10. The sensors or the measurement transducers 8, 9 can advantageously also be installed spaced from the winding 10, which makes it unnecessary to electrically insulate the sensors 8, 9. The measured values of the infrared radiation are simultaneously transmitted to the evaluation unit 12 for evaluation and for processing via the transmission means 13, 13*b* that can be implemented, for example as a wired connection, and displayed by the display 12*a*.

The measuring system can thus provide almost immediately a measurement value that is proportional to the actual temperature of the winding 10, so that the warning temperature, i.e. the temperature at which a warning is sounded indicating that the winding 10 and the motor can sustain damage if this temperature is exceeded, need no longer be reduced or need only be reduced slightly. The electric motor can then be safely operated closer to its rated power limit.

In addition, the measured values can advantageously be evaluated and/or stored in the evaluation unit 12 and/or displayed on the display 12*a*. The stored values can then be used to evaluate the performance over a longer period of time. The values can be stored in the memory integrated in the evaluation unit 12.

The evaluation unit 12 with the integrated display 12*a* can be located on or in the vicinity of the wiring support assembly 3, so that the displayed values are locally easily accessible and can be easily viewed.

In addition, adjustable predefinable limit values of the parameters to be measured, in particular warning and threshold temperatures, can also be inputted and stored in the evaluation unit 12. These limit values can be entered, for example, via a keypad integrated in the evaluation unit 12 or externally via a serial or parallel interface. The data can be stored in the memory integrated in the evaluation unit 12. Software programs stored in the evaluation unit 12 can be executed for comparing the values measured by the sensors 8, 9 with the predefined limit values in order to determine if an actual measurement value is within or outside a tolerance range or below a predefined limit value. The evaluation unit can output a corresponding warning signal if the adjustable, predefinable limit values for the measured parameters, in particular the temperature, are outside a specified range. The warning signal can be an acoustic signal, for example a siren, although other warning mechanisms can also be used.

Figure 2:
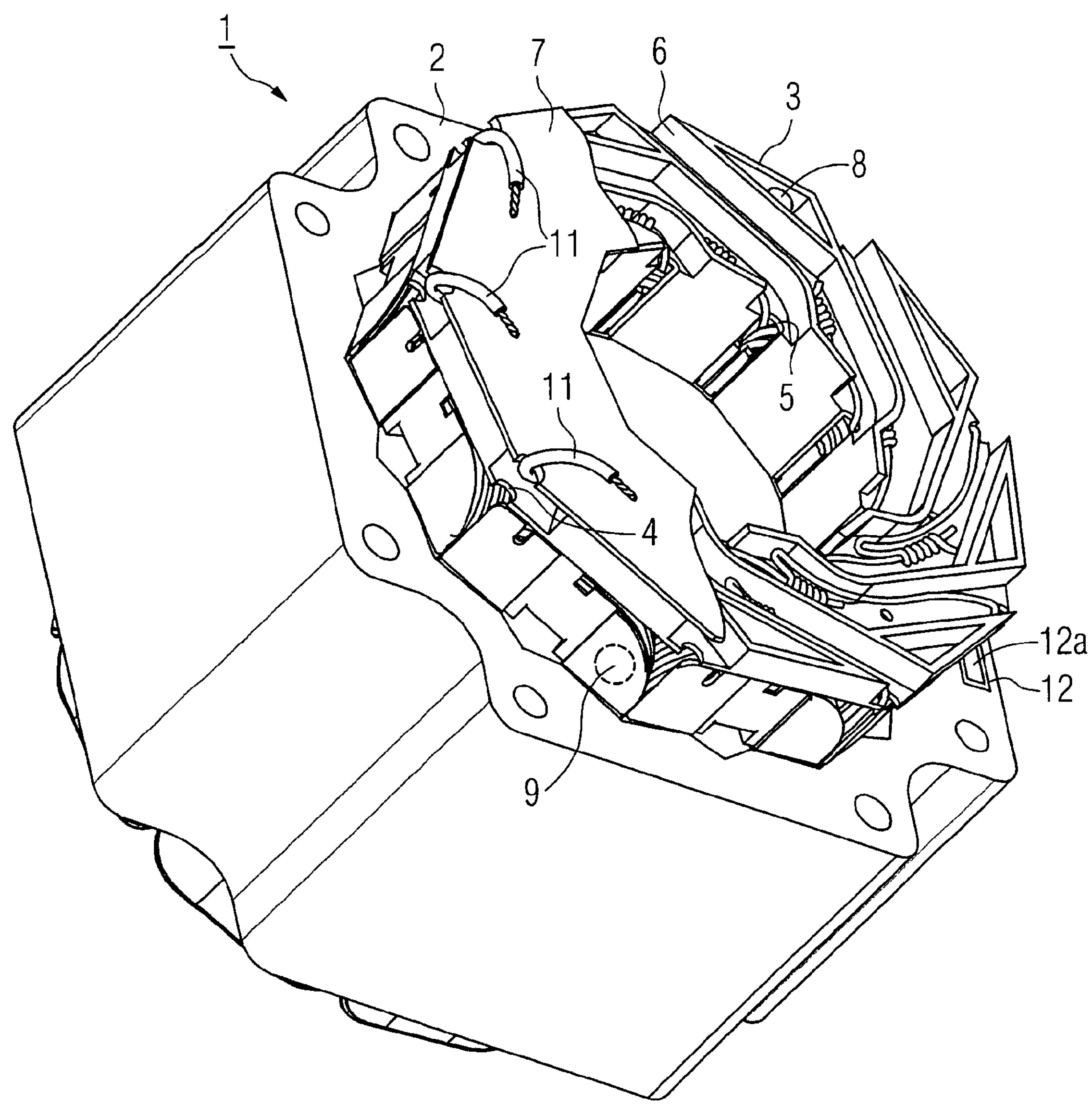
FIG. 2 is a perspective view of a stator with a winding support assembly.

FIG. 2 shows in a perspective view the stator 1 of an electric machine with the winding support assembly 3 that includes a measuring system according to the invention. It can be seen that the axial length of the stator 1 is significantly less than that of comparable conventional devices. Such winding support assembly 3 can easily accommodate series connections, parallel connections or special winding connections of the winding strands. When using special winding connections, several winding support assembly 3 can optionally be arranged sequentially in the axial direction.

Figure 3:
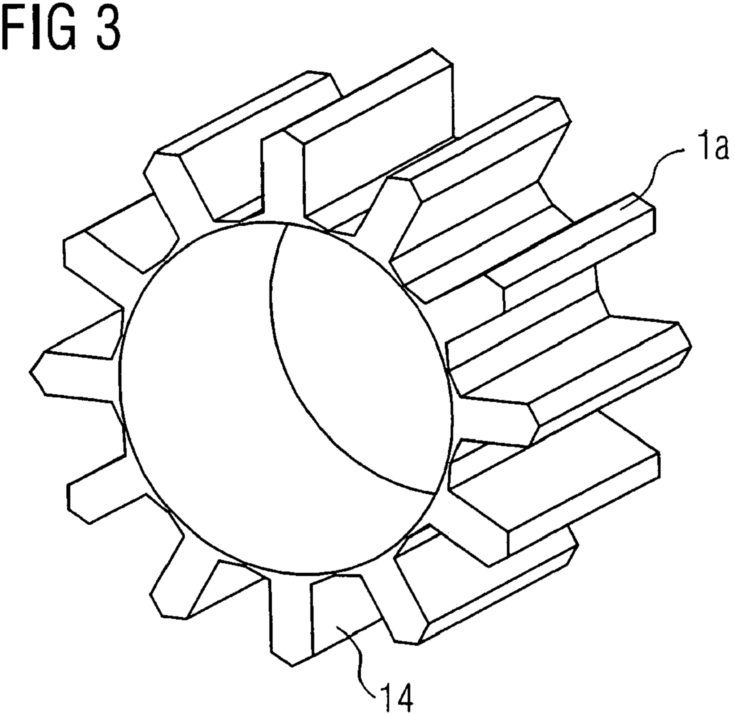
FIG. 3 shows a star-shaped laminated stator.

FIG. 3 shows a star-shaped stator 1*a* of an electric machine (not shown) of FIG. 1, which can be formed as a sheet metal laminate or a sintered component. The exemplary radially outwardly pointing poles 14 have a roof shape to enable insertion into a yoke 1*b*. It will be understood that the radially outmost regions of the poles 14 can also have other shapes, for example a rectangular or dovetail shape, suitable for insertion in a yoke 1*b*, and for subsequent positioning in and attachment to the yoke 1*b*. The star-shaped laminate of this stator can advantageously be provided with tooth coils 21.

Figure 4:
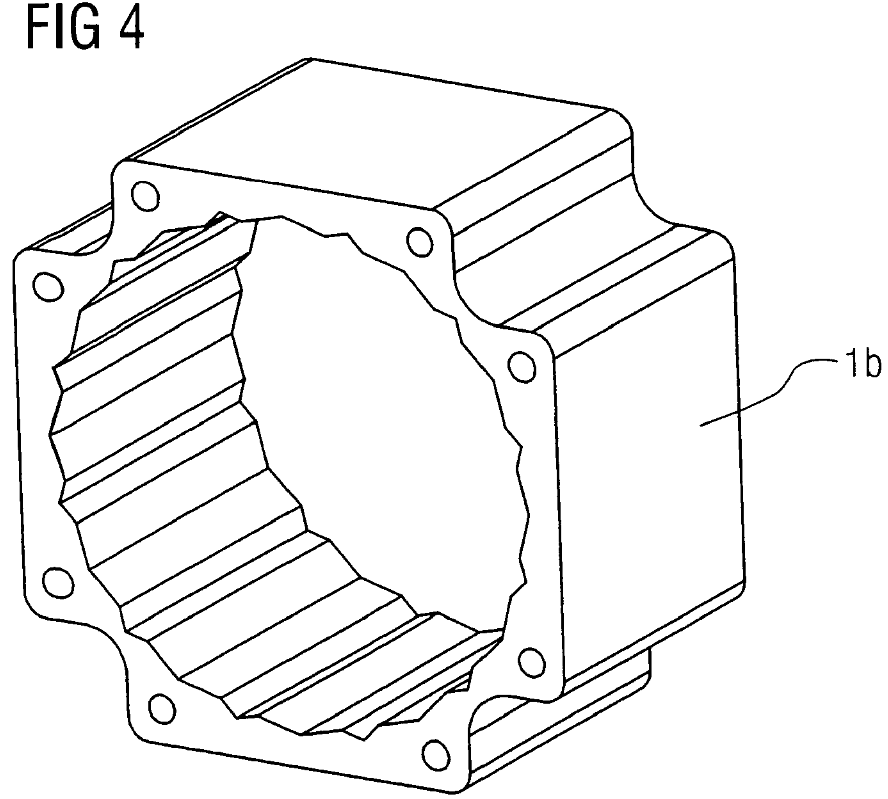
FIG. 4 shows a laminated yoke of a stator.

FIG. 4 shows a, for example, laminated yoke 1*b*, into which the star-shaped, for example, laminated stator 1*a* of FIG. 3 can be inserted. Coil forms 15 with windings 16 can be placed on the stator 1*a* by conventional thermal and mechanical methods (see also FIGS. 5 and 6). Optionally, the coil form 15 can latchingly engage with a groove provided on the corresponding pole 14. The combination of the laminated yoke 1*b* and the inserted stator la form the complete stator assembly 1 shown in FIGS. 1 and 2.

Figure 5:
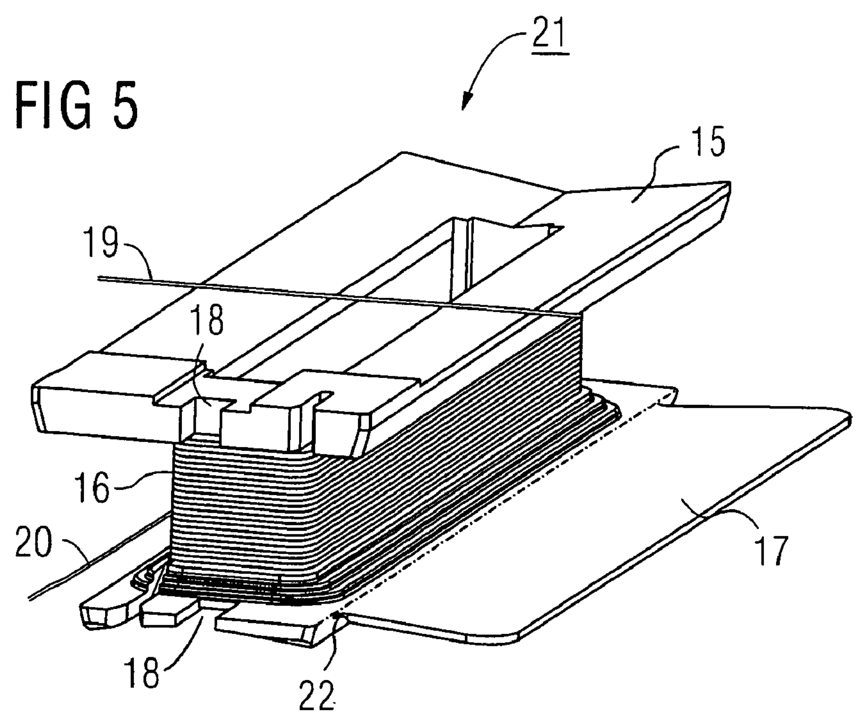
FIG. 5 shows a coil with a phase separator.

FIG. 5 shows in a perspective view a coil 21, it in particular a tooth coil, with an open flexible hinge 22 of a phase separator 17. In this configuration, a winding 16 can be wound on the coil form 15 using, for example, conventional automatic and/or semi-automatic coil winders. The winding start 20 is held by a freely movable winding device (not shown). The winding 16 is then fabricated and the lead-out wire 19 is held by a winding arm after the winding 16 is completed, so that the end turns are freely accessible at least on an end face of the winding 16. One or more terminal supports (not shown) can be snapped into recesses 18 disposed on the coil form 15. This secures the lead-out wires 19, 20, so that the windings 16 of the electric machine can be automatically electrically connected.

Figure 6:
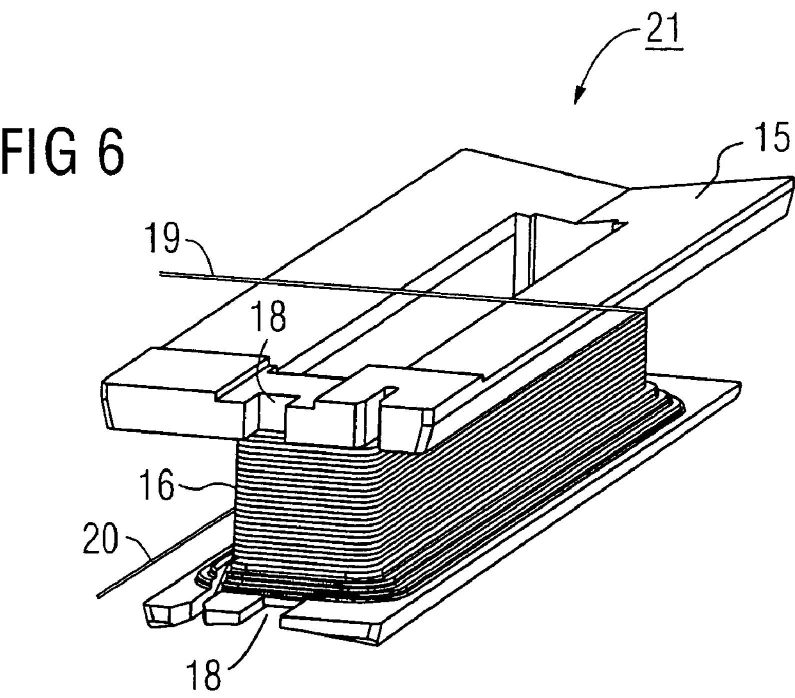
FIG. 6 shows a coil without a phase separator.

FIG. 6 shows the same coil as in FIG. 5, albeit without the phase separator 17.

In summary, the invention relates to an electric machine, in particular a motor, with a winding support assembly 3 and with a measuring system, preferably an infrared measuring system, which includes at least one sensor 8, 9 and an evaluation unit 12, whereby the measuring system is integrated in the winding support assembly. A contactless infrared sensor 8, 9 can almost instantaneously provide a measurement value that is proportional to the actual temperature of the winding system, which significantly improves the motor protection. Advantageously, the sensors 8, 9 are embedded, for example sealed, in the winding support assembly.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An electric machine comprising:

a stator having opposing end faces and a plurality of grooves;

at least one winding system received in the grooves of the stator and having winding strands;

at least one winding support assembly disposed on at least one end face of the stator and constructed to include channels for guiding the winding strands of the winding system, said channels being sized to allow ends of the winding strands to be connected to one another; and at least one measuring system integrated in the winding support assembly, wherein the measuring system operates in the absence of a mechanical contact with the at least one winding system.

2. The electric machine of claim 1, wherein the winding system comprises tooth coils.

3. The electric machine of claim 1, wherein the measuring system comprises at least one sensor selected from the group consisting of temperature sensor, vibration sensor, noise sensor and acceleration sensor.

4. The electric machine of claim 3, wherein the measuring system includes at least one evaluation unit connected with the at least one sensor by transmission means for bidirectional data exchange.

5. The electric machine of claim 3, wherein the sensor detects radiation emitted by the at least one winding system and is constructed without electrical insulation.

6. The electric machine of claim 3, wherein the at least one sensor is embedded in or sealed in the winding support assembly.

7. The electric machine of claim 1, wherein the measuring system is an infrared measuring system.

8. The electric machine of claim 1, wherein the at least one measuring system is constructed to provide a measurement value that is proportional to a temperature of the at least one winding system.

9. The electric machine of claim 1, wherein the channels have a spiral-shaped configuration.

10. An automation system with an electric machine, said electric machine comprising:

a stator having opposing end faces and a plurality of grooves;

at least one winding system received in the grooves of the stator and having winding strands;

at least one winding support assembly disposed on at least one end face of the stator and constructed to include channels for guiding the winding strands of the winding, said channels being sized to allow ends of the winding strands to be connected to one another; and at least one measuring system integrated in the winding support assembly, wherein the measuring system operates in the absence of a mechanical contact with the at least one winding system.

* * * * *